(12) United States Patent
Yamamoto et al.

(10) Patent No.: US 12,734,961 B2
(45) Date of Patent: Sep. 15, 2026

(54) SHIFT DEVICE

(71) Applicant: KABUSHIKI KAISHA TOKAI-RIKA-DENKI-SEISAKUSHO, Niwa-gun (JP)

(72) Inventors: Makoto Yamamoto, Niwa-gun (JP); Yutaka Inamura, Niwa-gun (JP); Takuya Watanabe, Niwa-gun (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 0 days.

(21) Appl. No.: 18/857,729

(22) PCT Filed: Mar. 28, 2023

(86) PCT No.: PCT/JP2023/012532
§ 371 (c)(1),
(2) Date: Oct. 17, 2024

(87) PCT Pub. No.: WO2023/203978
PCT Pub. Date: Oct. 26, 2023

(65) Prior Publication Data

US 2025/0269793 A1 Aug. 28, 2025

(30) Foreign Application Priority Data

Apr. 21, 2022 (JP) ................................ 2022-070384

(51) Int. Cl.
*F16H 59/12* (2006.01)
*B60K 20/02* (2006.01)
*B60Q 9/00* (2006.01)

(52) U.S. Cl.
CPC ................ *B60Q 9/00* (2013.01); *B60K 20/02* (2013.01); *F16H 59/12* (2013.01)

(58) Field of Classification Search
CPC ..... F16H 61/18; F16H 2061/248; F16H 59/12
See application file for complete search history.

(56) References Cited

U.S. PATENT DOCUMENTS 6,564,661 B2 * 5/2003 DeJonge ................ F16H 63/42 74/335
2002/0157492 A1 10/2002 Hayashi et al.

FOREIGN PATENT DOCUMENTS

JP 2002257222 A 9/2002
JP 2003-139229 A 5/2003
JP 2005-327064 A 11/2005
JP 2006177401 A * 7/2006 .......... G06F 3/0488
JP 2010-129034 A 6/2010
JP 2012-216113 A 11/2012
JP 2017-045251 A 3/2017

OTHER PUBLICATIONS

International Search Report issued in PCT/JP2023/012532, mailed Jun. 27, 2023.

* cited by examiner

*Primary Examiner* — Gregory Robert Weber
(74) *Attorney, Agent, or Firm* — Studebaker Brackett PLLC

(57) ABSTRACT

In a shift device, when an occupant performs a touch operation on a P position, an R position, an N position, or a D position of a front housing with a finger, a shift range of a transmission is changed, and the front housing vibrates. Here, a plurality of shift positions are provided on the front housing. Therefore, the number of components can be reduced.

4 Claims, 4 Drawing Sheets

SHIFT DEVICE

TECHNICAL FIELD

The present disclosure relates to a shift device in which an operation body is operable.

BACKGROUND ART

In a shift operation switch device described in Japanese Patent Application Laid-Open No. 2012-216113, a plurality of push buttons are provided in a switch unit, and the push buttons are pushed to change a range of a vehicle. In addition, an electromagnetic actuator increases a reaction force with respect to the push operation of the push button to notify that the change of the range of the vehicle is restricted.

Here, in such a shift operation switch device, the push button is provided for each range of the vehicle.

SUMMARY OF INVENTION

Technical Problem

The present disclosure has been made in view of the above circumstance, and an object of the disclosure is to obtain a shift device capable of reducing the number of components.

Solution to Problem

According to a first aspect of the present disclosure, a shift device includes: an operation body on which a plurality of shift positions are set; a detection portion that detects an operation on the shift position to change a shift range of a transmission of a vehicle; and a notification mechanism that notifies an occupant of the vehicle.

According to a second aspect of the disclosure, in the shift device according to the first aspect of the disclosure, the plurality of shift positions are set on the same surface of the operation body.

According to a third aspect of the disclosure, in the shift device according to the first or second aspect of the disclosure, the notification mechanism notifies that the shift range is changed.

According to a fourth aspect of the disclosure, in the shift device according to any one of the first to third aspects of the disclosure, the notification mechanism notifies that a change of the shift range is restricted.

According to a fifth aspect of the disclosure, in the shift device according to any one of the first to fourth aspects of the disclosure, the notification mechanism notifies of an operation on a portion between the shift positions.

According to a sixth aspect of the disclosure, in the shift device according to any one of the first to fifth aspects of the disclosure, the notification mechanism performs notification by vibration.

Advantageous Effects of Invention

In the shift device according to the first aspect of the disclosure, the plurality of shift positions are set on the operation body, and the detection portion detects an operation on the shift position to change the shift range of the transmission of the vehicle. The notification mechanism notifies the occupant of the vehicle.

Here, as described above, the plurality of shift positions are set on the operation body. Therefore, the number of operation bodies can be reduced, so that the number of components can be reduced.

In the shift device according to the second aspect of the disclosure, the plurality of shift positions are set on the same surface of the operation body. Therefore, a touch operation can be easily performed on the plurality of shift positions.

According to the third aspect of the disclosure, in the shift device according to the first or second aspect of the disclosure, the notification mechanism notifies that the shift range is changed. Therefore, the occupant can recognize that the shift range is changed.

In the shift device according to the fourth aspect of the disclosure, the notification mechanism notifies that a change of the shift range is restricted. Therefore, the occupant can recognize that the change of the shift range is restricted.

In the shift device according to the fifth aspect of the disclosure, the notification mechanism notifies of an operation on a portion between shift positions. Therefore, the occupant can recognize that the operation on a portion between the shift positions has been performed.

In the shift device according to the sixth aspect of the disclosure, the notification mechanism performs notification by vibration. Therefore, it is possible to clearly recognize that the occupant is notified.

DESCRIPTION OF EMBODIMENTS

Figure 1:
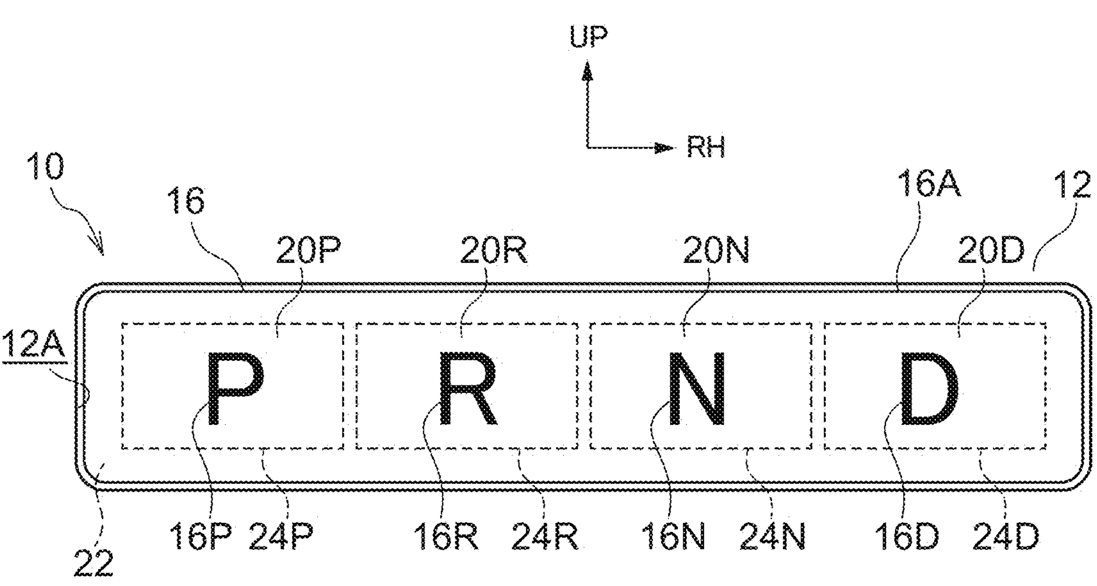
FIG. 1 is a front view showing a shift device according to an embodiment of the present disclosure when viewed from the front.
Figure 2:
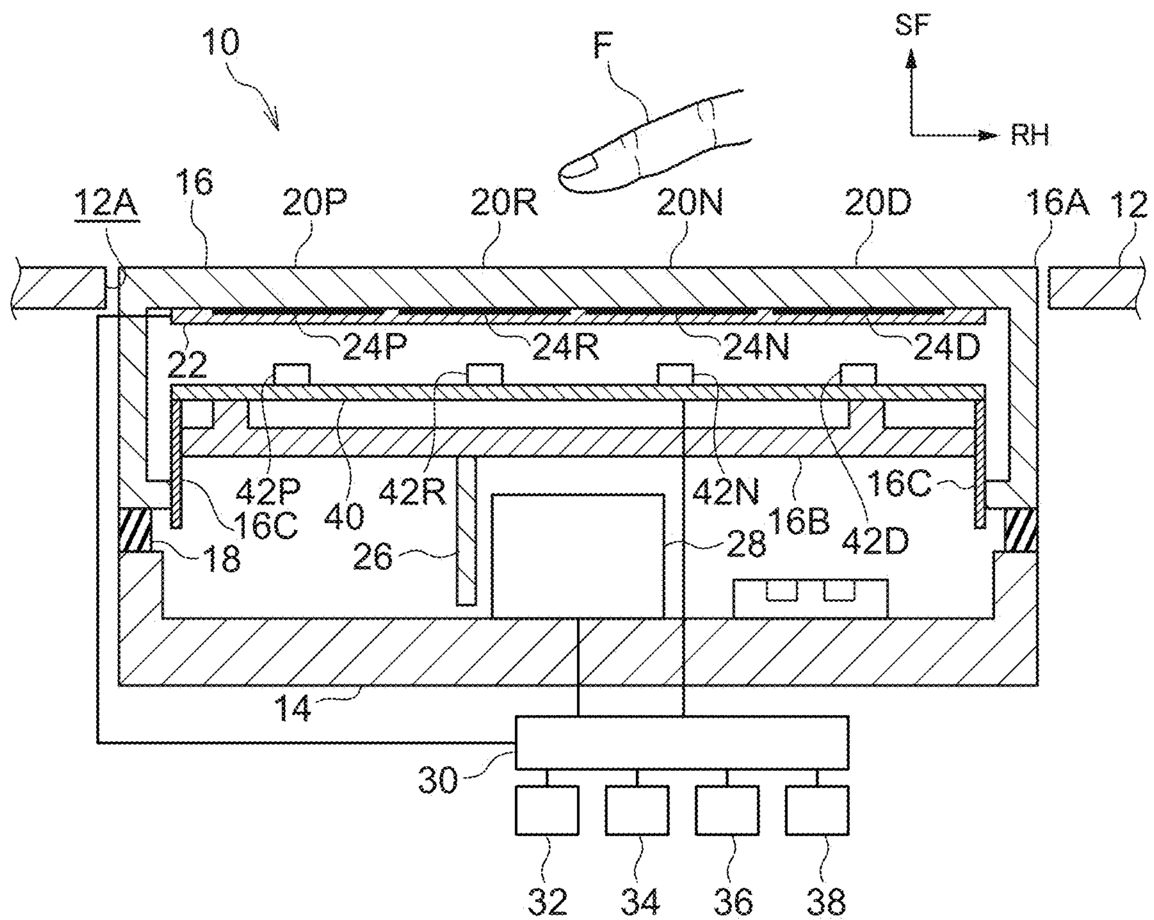
FIG. 2 is a cross-sectional view showing the shift device according to the embodiment of the disclosure when viewed from below.

FIG. 1 is a front view of a shift device 10 according to an embodiment of the present disclosure when viewed from the front, and FIG. 2 is a cross-sectional view of the shift device 10 when viewed from below. In the drawings, a front side of the shift device 10 is indicated by an arrow SF, a right side of the shift device 10 is indicated by an arrow RH, and an upper side of the shift device 10 is indicated by an arrow UP.

As illustrated in FIGS. 1 and 2, the shift device 10 according to the present embodiment is installed at the center of an instrument panel 12 of a vehicle (automobile) in a vehicle width direction, and is disposed inside a steering wheel (not illustrated) of the vehicle in the vehicle width direction. The front side, the right side, and the upper side of the shift device 10 are directed to a rear side, a right side, and an upper side of the vehicle, respectively.

The shift device 10 includes a case 14 having a substantially rectangular parallelepiped box shape as an installation body, and the case 14 is fixed to a vehicle front side of the instrument panel 12. The case 14 is elongated in a left-right direction, and the inside of the case 14 is opened to a front side. In the instrument panel 12, a rectangular opening 12A is formed on a vehicle rear side of the case 14, and the case 14 faces the opening 12A.

A substantially rectangular parallelepiped box-shaped housing 16 as an operation body is provided on the front side of the case 14, and the housing 16 is elongated in the left-right direction and made of, for example, a resin to be an insulator. A front housing 16A having a substantially rectangular parallelepiped box shape is provided in a front side portion of the housing 16, and a portion other than an outer peripheral portion of a back wall of the front housing 16A is opened. A back housing 16B having a substantially rectangular plate shape is provided in a back side portion of the housing 16, and the back housing 16B is disposed in parallel with a front wall of the front housing 16A in the front housing 16A. A left surface in the back wall of the front housing 16A and a left surface of the back housing 16B, and a right surface in the back wall of the front housing 16A and a right surface of the back housing 16B are connected by leaf springs 16C having a rectangular plate shape as connection members, and the leaf spring 16C is arranged in a direction perpendicular to the left-right direction and is elastically deformable.

A diaphragm 26 made of metal and having a rectangular plate shape is fixed to the back housing 16B, and the diaphragm 26 protrudes backward and is arranged in a direction perpendicular to the left-right direction.

A rectangular frame-shaped rubber 18 as an elastic member is provided between a side wall of the case 14 and the outer peripheral portion of the back wall of the housing 16, and the rubber 18 connects the case 14 and the housing 16 and is elastically deformable.

The front wall of the housing 16 is substantially fitted to the opening 12A of the instrument panel 12, and a small gap is formed around the entire periphery between the front wall of the housing 16 and a peripheral surface of the opening 12A. A flat front side surface of the housing 16 forms a design surface of a vehicle interior of the vehicle together with a vehicle rear side surface of the instrument panel 12, and the front side surface of the housing 16 can be touched by a finger F of an occupant (particularly, a driver) of the vehicle.

A rectangular P position 20P (park position), an R position 20R (reverse position), an N position 20N (neutral position), and a D position 20D (drive position) as shift positions are set on the front side surface of the housing 16, and the P position 20P, the R position 20R, the N position 20N, and the D position 20D are arranged at equal intervals in this order from the left to the right. In addition, a “P” indicator 16P, an “R” indicator 16R, an “N” indicator 16N, and a “D” indicator 16D as shift indicators are displayed at central portions of the P position 20P, the R position 20R, the N position 20N, and the D position 20D, respectively.

A rectangular sheet-shaped electrostatic sheet 22 as a detection portion is fixed to a back side of the front wall of the housing 16, and the electrostatic sheet 22 covers a back side surface of the front wall of the housing 16. A P electrode 24P, an R electrode 24R, an N electrode 24N, and a D electrode 24D each having a rectangular film shape as shift detection portions are provided on a front side of the electrostatic sheet 22, and the P electrode 24P, the R electrode 24R, the N electrode 24N, and the D electrode 24D are arranged at equal intervals in this order from the left to the right. A dimension of each of the P electrode 24P, the R electrode 24R, the N electrode 24N, and the D electrode 24D in the left-right direction is larger than a dimension of the finger F of the occupant in a width direction, and a dimension of a gap between the P electrode 24P and the R electrode 24R, a gap between the R electrode 24R and the N electrode 24N, and a gap between the N electrode 24N and the D electrode 24D in the left-right direction is smaller than the dimension of the finger F of the occupant in the width direction. The entirety of each of the P electrode 24P, the R electrode 24R, the N electrode 24N, and the D electrode 24D faces the entirety of each of the P position 20P, the R position 20R, the N position 20N, and the D position 20D in a front-back direction (a thickness direction of the front wall of the housing 16), and the P electrode 24P, the R electrode 24R, the N electrode 24N, and the D electrode 24D are made of, for example, metal and have conductivity.

The front wall (including the electrostatic sheet 22) of the housing 16 can transmit light at portions of the “P” indicator 16P, the “R” indicator 16R, the “N” indicator 16N, and the “D” indicator 16D.

A circuit board 40 is provided in the housing 16, and the circuit board 40 is fixed to a front side of the back housing 16B. A P element 42P, an R element 42R, an N element 42N, and a D element 42D as illumination units are fixed to a front side surface of the circuit board 40, and the P element 42P, the R element 42R, the N element 42N, and the D element 42D are light emitting diodes (LEDs), and face the portions of the “P” indicator 16P, the “R” indicator 16R, the “N” indicator 16N, and the “D” indicator 16D on the front wall of the housing 16 in the front-back direction, respectively.

An electromagnet 28 as a notification mechanism is fixed in the case 14, and the electromagnet 28 is disposed near a right side of the diaphragm 26 of the back housing 16B.

When the electromagnet 28 is operated, the electromagnet 28 periodically generates magnetic flux on a left side and attracts the diaphragm 26 by a magnetic force, whereby the back housing 16B vibrates in the left-right direction integrally with the diaphragm 26, and the front housing 16A vibrates in the left-right direction while the leaf springs 16C and the rubbers 18 are elastically deformed in the left-right direction.

The P electrode 24P, the R electrode 24R, the N electrode 24N, and the D electrode 24D of the electrostatic sheet 22, the P element 42P, the R element 42R, the N element 42N, and the D element 42D of the circuit board 40, and the electromagnet 28 are electrically connected to a control device 30 of the vehicle. The control device 30 is provided with a microcomputer in which a central processing unit (CPU), a read only memory (ROM), a random access memory (RAM), a non-volatile memory (storage), and the like are connected by a bus. In the control device 30, the CPU reads a program stored in the ROM and the storage and executes the program while loading the program in the RAM, thereby implementing various functions. In addition, a transmission 32 (automatic transmission) and a brake 34 (foot brake) of the vehicle, a speedometer 36 of the vehicle, and an N switch 38 (neutral lock switch) are electrically connected to the control device 30.

Next, actions according to the embodiment will be described.

In the shift device 10 having the above configuration, when the occupant performs a touch operation on the P position 20P, the R position 20R, the N position 20N, or the D position 20D on the front side surface of the housing 16 (the front housing 16A) with the finger F, an electrostatic capacitance is generated between the finger F and the P electrode 24P, the R electrode 24R, the N electrode 24N, or the D electrode 24D of the electrostatic sheet 22. When the capacitance between the finger F and the P electrode 24P, the R electrode 24R, the N electrode 24N, or the D electrode 24D is equal to or larger than a selection threshold, the control device 30 determines that the P position 20P, the R position 20R, the N position 20N, or the D position 20D is selected, and a shift range of the transmission 32 is changed to a corresponding P range (park range), R range (reverse range), N range (neutral range), or D range (drive range) under the control of the control device 30.

When the shift range of the transmission 32 is changed to the P range, the R range, the N range, or the D range, the P element 42P, the R element 42R, the N element 42N, or the D element 42D of the circuit board 40 emits light under the control of the control device 30, such that the "P" indicator 16P, the "R" indicator 16R, the "N" indicator 16N, or the "D" indicator 16D on the front side surface of the housing 16 is illuminated.

In a case where the brake 34 is not operated (turned off) when the transmission 32 is in the P range (predetermined opportunity), even when the R position 20R, the N position 20N, or the D position 20D is selected, the change of the shift range of the transmission 32 is restricted under the control of the control device 30.

On the other hand, in a case where the brake 34 is operated (turned on) when the transmission 32 is in the P range, the R position 20R, the N position 20N, or the D position 20D is selected, such that the transmission 32 is changed to the R range, the N range, or the D range under the control of the control device 30.

In a case where a forward speed or backward speed of the vehicle is equal to or higher than a predetermined speed (a forward speed or backward speed of the vehicle measured by the speedometer 36 is equal to or higher than a predetermined speed) when the transmission 32 is in the D range or the R range (predetermined opportunity), the change of the shift range of the transmission 32 is restricted under the control of the control device 30 even when the P position 20P is selected.

On the other hand, in a case where the forward speed or backward speed of the vehicle is lower than the predetermined speed (the forward speed or backward speed of the vehicle measured by the speedometer 36 is lower than the predetermined speed) when the transmission 32 is in the D range or the R range, the transmission 32 is changed to the P range under the control of the control device 30 when the P position 20P is selected.

In a case where the N switch 38 is turned on when the transmission 32 is in the N range (predetermined opportunity), the change of the shift range of the transmission 32 is restricted under the control of the control device 30 even when the P position 20P, the R position 20R, or the D position 20D is selected.

On the other hand, in a case where the N switch 38 is turned off when the transmission 32 is in the N range, the transmission 32 is changed to the P range, the R range, or the D range under the control of the control device 30 when the P position 20P, the R position 20R, or the D position 20D is selected.

Here, a plurality of shift positions are provided on the housing 16. Therefore, the number of housing 16 can be one, so that the number of components can be reduced, and the cost can be reduced. In addition, since one housing 16 (operation body) is provided, the appearance of the shift device 10 can be improved.

Further, the P position 20P, the R position 20R, the N position 20N, and the D position 20D are set on the front side surface (the same surface) of the housing 16. Therefore, for example, the occupant can perform the touch operation on the P position 20P, the R position 20R, the N position 20N, and the D position 20D by tracing the front side surface of the housing 16 with the finger F, and can easily perform the touch operation on the P position 20P, the R position 20R, the N position 20N, and the D position 20D.

Further, when the P position 20P, the R position 20R, the N position 20N, or the D position 20D is selected and the shift range of the transmission 32 is changed, the electromagnet 28 is operated in a first operation mode under the control of the control device 30, and the front housing 16A vibrates in the left-right direction in a first notification mode (for example, in a short time), so that the occupant is notified that the shift range of the transmission 32 is changed. Therefore, the occupant can recognize that the shift range of the transmission 32 is changed.

In addition, when the change of the shift range of the transmission 32 is restricted even in a case where the P position 20P, the R position 20R, the N position 20N, or the D position 20D is selected, the electromagnet 28 is operated in a second operation mode under the control of the control device 30, and the front housing 16A vibrates in the left-right direction in a second notification mode (for example, for a long time), so that the occupant is notified that the change of the shift range of the transmission 32 is restricted. Therefore, the occupant can recognize that the change of the shift range of the transmission 32 is restricted.

In addition, in a case where the finger F of the occupant touches a portion between the P position 20P and the R position 20R, a portion between the R position 20R and the N position 20N, or a portion between the N position 20N and the D position 20D, and a capacitance between the finger F and the P electrode 24P and the R electrode 24R, a capacitance between the finger F and the R electrode 24R and the N electrode 24N, or a capacitance between the finger F and the N electrode 24N and the D electrode 24D are smaller than the selection threshold and equal to or larger than an intermediate threshold, the electromagnet 28 is operated in a third operation mode under the control of the control device 30, and the front housing 16A vibrates in the left-right direction in a third notification mode (for example, for an extremely short time). Therefore, the occupant can recognize that the touch operation with the finger F is performed on a portion between the shift positions. Further, when the occupant traces the front side surface of the front housing 16A with the finger F to change the shift position to be touched, the front housing 16A vibrates in the third notification mode, so that the occupant can recognize that the shift position to be touched is changed.

Further, the electromagnet 28 vibrates the front housing 16A to notify the occupant. Therefore, the occupant can recognize the vibration of the front housing 16A through the finger F, and can clearly recognize that the occupant is notified.

(First Modification)

Figure 3:
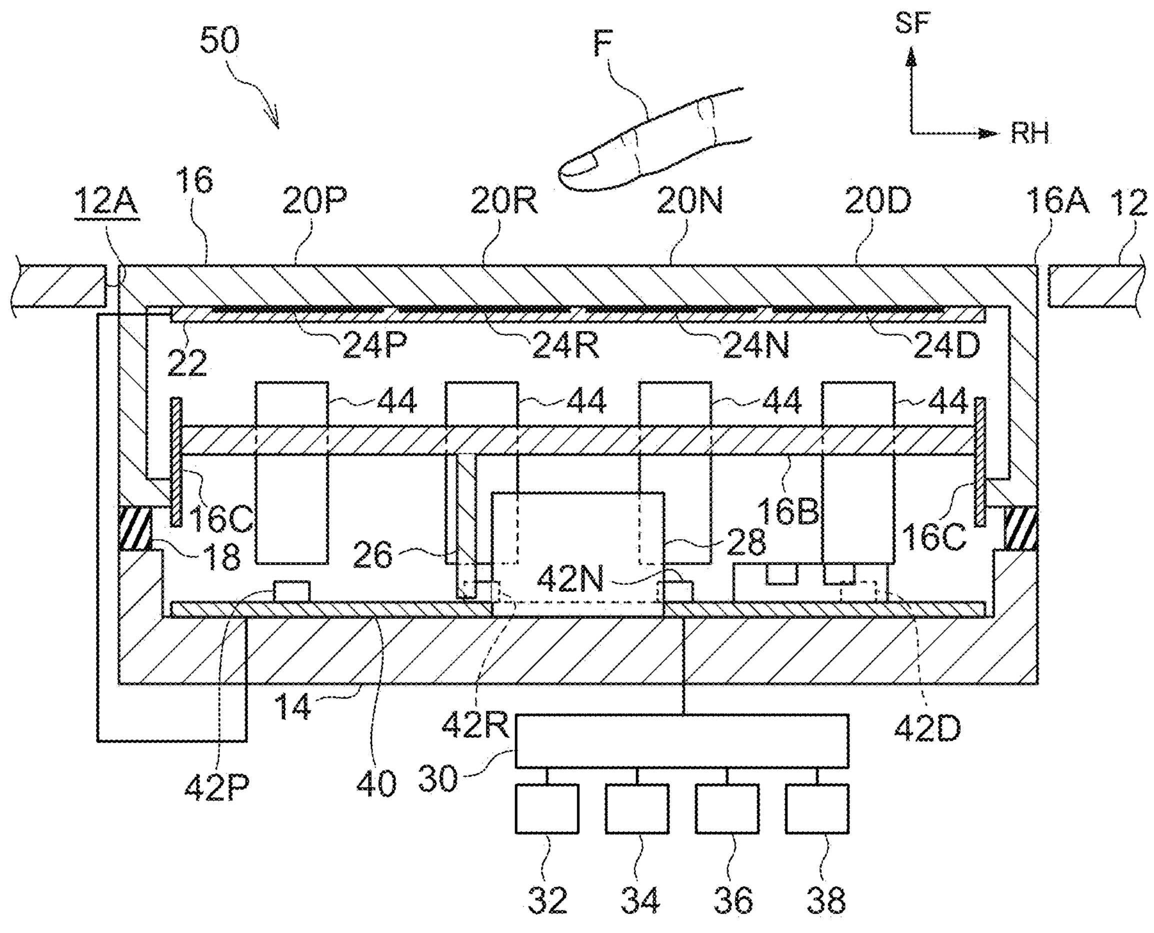
FIG. 3 is a cross-sectional view showing a shift device according to a first modification of the embodiment of the disclosure when viewed from below.

FIG. 3 is a cross-sectional view of a shift device 50 according to a first modification of the embodiment when viewed from below.

As illustrated in FIG. 3, in the shift device 50 according to the present modification, a circuit board 40 is fixed to a back side surface in a case 14, and an electromagnet 28 penetrates through and is electrically connected to the circuit board 40. Columnar light guides 44 as guide members are provided between a P element 42P, an R element 42R, an N element 42N, and a D element 42D of the circuit board 40 and portions of a "P" indicator 16P, an "R" indicator 16R, an "N" indicator 16N, and a "D" indicator 16D on a front wall of a housing 16, and the light guides 44 penetrate through and are fixed to a back housing 16B of the housing 16. The light guides 44 are arranged parallel to a front-back direction, and the light guides 44 are made transparent to guide light.

A P electrode 24P, an R electrode 24R, an N electrode 24N, and a D electrode 24D of an electrostatic sheet 22, the P element 42P, the R element 42R, the N element 42N, and the D element 42D of the circuit board 40, and the electromagnet 28 are electrically connected to a control device 30 via the circuit board 40.

When a shift range of a transmission 32 is changed to a P range, an R range, an N range, or a D range, the P element 42P, the R element 42R, the N element 42N, or the D element 42D of the circuit board 40 emits light under the control of the control device 30, such that the light guide 44 guides the light to illuminate the "P" indicator 16P, the "R" indicator 16R, the "N" indicator 16N, or the "D" indicator 16D on a front side surface of the housing 16.

(Second Modification)

Figure 4:
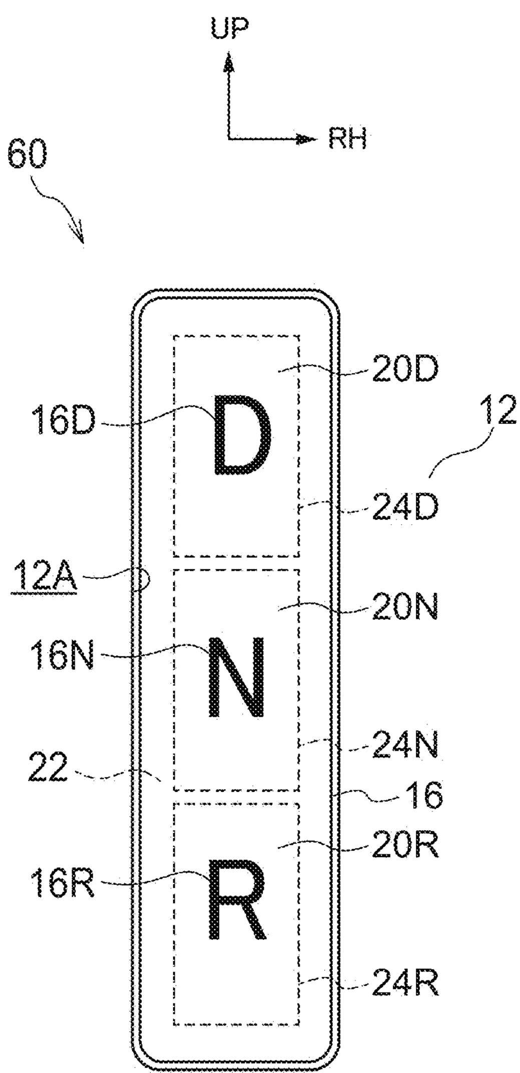
FIG. 4 is a front view showing a shift device according to a second modification of the embodiment of the disclosure when viewed from the front.

FIG. 4 is a front view of a shift device 60 according to a second modification of the embodiment when viewed from the front.

As illustrated in FIG. 4, in the shift device 60 according to the present modification, an opening 12A of an instrument panel 12, a case 14, and a housing 16 are elongated in an up-down direction, and in the shift device 60, the left side, the right side, the upper side, and the lower side of the embodiment are set to the lower side, the upper side, the left side, and the right side, respectively. A P position 20P and a "P" indicator 16P are not provided on the housing 16, and a P electrode 24P and a P element 42P are not provided on an electrostatic sheet 22 and a circuit board 40, respectively.

Meanwhile, when an occupant performs a touch operation on an N position 20N on a front side surface of the housing 16 (front housing 16A) with a finger F and a capacitance between the finger F and an N electrode 24N is equal to or larger than a selection threshold, a control device 30 determines that the N position 20N is selected, and a shift range of a transmission 32 is changed to an N range under the control of the control device 30.

Thereafter, in a case where the finger F touches a portion between the N position 20N and the R position 20R when the occupant traces the front side surface of the front housing 16A from the N position 20N toward an R position 20R (lower side) with the finger F, and each electrostatic capacitance between the finger F and the portion between the N electrode 24N and an R electrode 24R becomes smaller than the selection threshold and equal to or larger than an intermediate threshold, and then the finger F touches the R position 20R, and an electrostatic capacitance between the finger F and the R electrode 24R becomes equal to or larger than the selection threshold for a time equal to or longer than a specified time, the control device 30 determines that the R position 20R is selected, and the shift range of the transmission 32 is changed to an R range under the control of the control device 30. Therefore, in order to change the shift range of the transmission 32 to the R range, the finger F needs to maintain a state of continuously touching from the N position 20N to the R position 20R through the portion between the N position 20N and the R position 20R.

On the other hand, in a case where the finger F touches a portion between the N position 20N and a D position 20D when the occupant traces the front side surface of the front housing 16A from the N position 20N toward the D position 20D (upper side) with the finger F, and a capacitance between the finger F and the portion between the N electrode 24N and a D electrode 24D become smaller than the selection threshold and equal to or larger than the intermediate threshold, and then the finger F touches the D electrode 24D, and a capacitance between the finger F and the D electrode 24D become equal to or larger than the selection threshold for the specified time, the control device 30 determines that the D position 20D is selected, and the shift range of the transmission 32 is changed to the D range under the control of the control device 30.

Therefore, in order to change the shift range of the transmission 32 to the D range, the finger F needs to maintain a state of continuously touching from the N position 20N to the D position 20D through the portion between the N position 20N and the D position 20D.

Here, as described above, when the N position 20N is selected and the shift range of the transmission 32 is changed to the N range, when the R position 20R is selected and the shift range of the transmission 32 is changed to the R range, and when the D position 20D is selected and the shift range of the transmission 32 is changed to the D range, an electromagnet 28 is operated in a first operation mode under the control of the control device 30, and the front housing 16A vibrates in the up-down direction in a first notification mode (for example, for a short time).

Furthermore, as described above, when the electrostatic capacitance between the finger F and the portion between the N electrode 24N and the R electrode 24R is smaller than the selection threshold and is equal to or larger than the intermediate threshold, and when the electrostatic capacitance between the finger F and the portion between the N electrode 24N and the D electrode 24D is smaller than the selection threshold and is equal to or larger than the intermediate threshold, the electromagnet 28 is operated in a third operation mode under the control of the control device 30, and the front housing 16A vibrates in the up-down direction in a third notification mode (for example, for an extremely short time).

In the present modification, an H position (home position), an "H" indicator, and an H electrode (home electrode) may be provided instead of the N position 20N, the "N" indicator 16N, and the N electrode 24N, respectively. In this case, in a case where the occupant performs a touch operation on the H position on the front side surface of the housing 16 (front housing 16A) with the finger F and an electrostatic capacitance between the finger F and the H electrode is equal to or larger than the selection threshold, the control device 30 determines that the H position is selected, and the shift range of the transmission 32 is not changed.

In the embodiment (including the first modification and the second modification), the electromagnet 28 (notification mechanism) vibrates the front housing 16A to notify the occupant. However, a light emitting device as a notification mechanism may also generate light (for example, illuminate a shift indicator) to notify the occupant. In addition, a sound producing device as a notification mechanism may generate a sound (for example, a voice or a buzzer sound) to notify the occupant.

Furthermore, in the embodiment (including the first modification and the second modification), the front side surface of the housing 16 is flat. However, the front side surface of the housing 16 may be a curved surface.

In the embodiment (including the first modification and the second modification), the shift devices 10, 50, and 60 are installed on an instrument panel. However, the shift devices 10, 50, and 60 may be installed on other parts of the vehicle (such as a console or a column cover).

Furthermore, in the embodiment and the first modification, the housing 16 is elongated in the vehicle width direction, and the plurality of shift positions are arranged in a horizontal direction. However, the housing 16 may be elongated in a vehicle up-down direction or a vehicle front-rear direction, and the plurality of shift positions may be arranged in a vertical direction.

Moreover, in the second modification, the housing 16 is elongated in the vehicle up-down direction, and the plurality of shift positions are arranged in the vertical direction. However, the housing 16 may be elongated in the vehicle front-rear direction and the plurality of shift positions may be arranged in the vertical direction, or the housing 16 may be elongated in the vehicle width direction and the plurality of shift positions may be arranged in the horizontal direction.

The disclosure of Japanese Patent Application No. 2022-070384 filed on Apr. 21, 2022 is incorporated herein by reference in its entirety.

All documents, patent applications, and technical standards mentioned herein are incorporated herein by reference to the same extent as if each individual document, patent application, and technical standard were specifically and individually stated.

The invention claimed is:

1. A shift device comprising:

an operation body on which a plurality of shift positions are set and which has a plurality of notification modes;

a detection portion, the detection portion being configured to detect an operation on one of the shift positions and to change a shift range of a transmission of a vehicle; and a notification mechanism, the notification mechanism being configured to notify an occupant of the vehicle, by a first notification mode among the plurality of notification modes, of an operation on a portion of the operation body between the shift positions caused by simultaneous touching by a finger of two or more of the plurality of shift positions, and to notify the occupant, by a second notification mode among the plurality of notification modes, that the shift range is changed, wherein the first notification mode and the second notification mode are different from each other.

2. The shift device according to claim 1, wherein the plurality of shift positions are set on a same surface of the operation body.

3. The shift device according to claim 1, wherein the notification mechanism is configured to notify that a change of the shift range is restricted.

4. The shift device according to claim 1, wherein the notification mechanism is configured to perform notification by vibration.

* * * * *